Oct. 12, 1965     E. M. GREER     3,211,184
PRESSURE VESSEL CONSTRUCTION
Filed Oct. 30, 1961
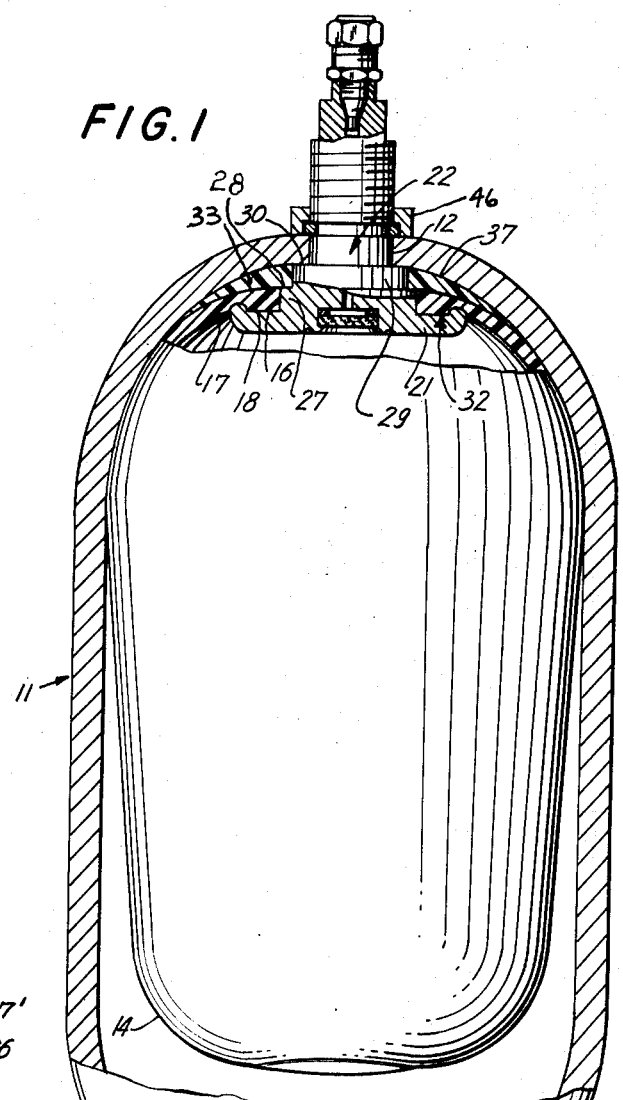
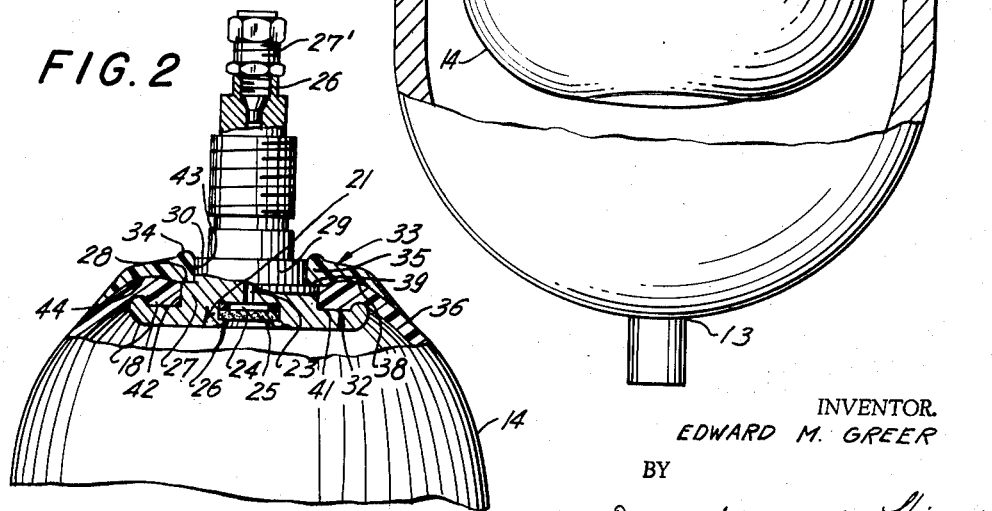
INVENTOR.
EDWARD M. GREER
BY
Dean, Fairbank & Hirsch
ATTORNEYS 3,211,184
PRESSURE VESSEL CONSTRUCTION
Edward M. Greer, Beverly Hills, Calif., assignor to Greer Hydraulics, Inc., Los Angeles, Calif., a corporation of New York
Filed Oct. 30, 1961, Ser. No. 148,318
2 Claims. (Cl. 138—30)

This invention relates to the art of pressure vessels of the type comprising a rigid container with a bladder intervening between the fluids in said container.

It is noted that where a bladder is molded in one piece on a core and stripped from the core by applying gas under pressure between the bladder and the core, if the mouth of the bladder is of relatively small diameter with respect to the maximum diameter of the core, unless the mouth is readily stretchable, the bladder cannot be removed or the mouth of the bladder will tear.

Where, in order that the mouth of the bladder may be securely retained in position in a pressure vessel, and also that a dependable seal be provided, it is provided with a thickened bead which can readily be clamped by suitable fittings such as is shown in Patent No. 2,786,488, if the mouth is of relatively small diameter, the thickened bead may prevent the necessary stretching of the mouth of the bladder for removal from the mold used in its fabrication.

It is accordingly among the objects of the invention to provide a bladder assembly which will insure dependable retention of the mouth of the bladder in a container with relatively simple clamping elements, and without possibility of cutting of the bladder adjacent its mouth, yet which will permit the molding on a core of a bladder with a relatively small diameter mouth with a minimum of increased thickness so that such mouth will readily stretch for removal from the core without likelihood of tearing.

According to the invention these objects are accomplished by the arrangement and combination of elements hereinafter described and more particularly recited in the claims.

In the accompanying drawings in which is shown one of various possible embodiments of the several features of the invention, FIG. 1 is a longitudinal view partly in cross section of a pressure vessel having a bladder assembly according to the invention, and FIG. 2 is a fragmentary sectional view of the bladder assembly before mounting in the pressure vessel.

Referring now to the drawings, the pressure vessel which may be a pressure accumulator, comprises a shell or container 11 of rigid material preferably cylindrospherical as shown and having axially aligned ports 12 and 13 at each end.

The invention resides in the means to retain a bladder 14 in position in the shell and the construction of such bladder.

The bladder 14 which illustratively is substantially conical along its length, is desirably of resilient material such as rubber or synthetic plastic of like physical characteristics and is capable of readily collapsing and expanding in use. The mouth 16 of the bladder has an annular bead or rim 18 on its inner surface which is only slightly thicker than the adjacent wall portion 17 thereof so that ready removal of the bladder from the core on which it is molded is not prevented.

Positioned in the mouth 16 of the bladder 14 is a circular plate or disc 21 which has an axial stem 22 rising therefrom and preferably formed integral therewith. Extending through the stem and the disc is an axial bore 23, which is of enlarged diameter at its inner end defining a cavity 24 in the undersurface of the disc 21 in which is positioned a plug of porous material 25, such as sintered metal such as bronze, for example, said plug being retained in position as by rolling over a peripheral lip 26 at the periphery of the cavity 24.

The outer end of bore 23 is desirably internally threaded as at 26 to receive the correspondingly threaded end of an air valve 27', which may be a conventional Schraeder valve. The stem 22 has an enlarged diameter portion 27 adjacent the disc 21 which defines an annular shoulder 28 and a further enlarged diameter portion 29 which is of diameter less than that of enlarged diameter portion 27, i.e., of diameter equal to that of the inner diameter of the shoulder 28 and greater than the diameter of the body of the stem thereby defining an annular shoulder 30. The stem has a diameter but slightly smaller than that of the port 12 so that it may fit therein with but slight clearance.

The disc 21 is desirably provided with an annular groove 32 in its upper surface between its periphery and the enlarged diameter portion 27. This annular groove is designed to receive the rim 18 of the bladder as is clearly shown in FIG. 2.

Encompassing the enlarged diameter portion 29 of the stem is a spacer member 33 desirably a disc of resilient material such as natural or synthetic rubber which, preferably, is of the same type as the bladder.

As is shown in FIG. 2 the spacer member 33 desirably has an upstanding annular bead 34 adjacent its inner periphery which rises above the top surface of said spacer member. The portion 35 of the spacer member adjacent its inner periphery is of greater thickness than the remaining portion thereof, the outer portion of the spacer member tapering to a relatively thin edge as at 36. The spacer member is desirably curved on its outer surface to conform substantially to the curvature of the inner surface 37 of the container and the inner surface is concave as at 38 between a flat portion 39 at its inner periphery and the tapered portion thereof.

In assembling the bladder 14 and associated stem 22 and spacer member 33, the rim 18 of the bladder 14 is positioned in annular groove 32 and bonded to the floor thereof as at 41 and to the side wall of enlarged diameter portion 27 as at 42. The spacer member 33 which encompasses the enlarged diameter portion 29 of the valve stem 22 is bonded thereto as at 43 and is also bonded to the shoulder 28 at its flat portion 39 and to the outer surface of the bladder which it engages as at 44.

With the bladder and associated elements thus assembled, it is apparent that by reason of the curvature 38 in the undersurface of the spacer member, such curved undersurface 38 will be against that portion of the outer surface of the bladder immediately aligned with the periphery of the disc 21 and the adjacent portion of the annular groove 32. Furthermore, the bead 34 of the spacer member and the adjacent portion thereof will extend above the plane of the shoulder 30 defined by enlarged diameter portion 29.

As a result, when the valve stem 22 with the bladder 14 connected therewith is inserted through the port 12 of the container 11 and a nut 46 encompassing the threaded outer end of the stem is tightened, the valve stem will be moved outwardly until the shoulder 30 abuts against the portion of the container adjacent the inner periphery of the port 12. Such movement will compress the bead 34 of the spacer member as well as the adjacent portion thereof which in turn will compress the portion of the bladder adjacent its mouth 16. As a result, the rim of the bladder will be securely clamped in the annular groove 32.

By reason of the bladder construction above described, with the relatively thin enlarged rim 18 at the mouth thereof, when the bladder is originally molded, it may readily be stripped from the mold core even though the mouth of the bladder is relatively small and of much less diameter than the maximum diameter of the core used in forming the same. If an enlarged rim was used it would have relatively little stretchability and hence the bladder could not readily be removed from the mold core without tearing and rupture of the mouth of the bladder.

The provision of the resilient spacer member in association with the mouth of the bladder in conjunction with the bonding of such mouth and the spacer member to each other and to the valve stem provides secure retention in the container 11 even with a bladder which initially has a relatively thin enlarged rim at the mouth thereof.

The relatively simple construction above described thus greatly facilitates the manufacture of bladders having relatively small diameter mouths and provides for dependable retention of the mouth of the bladder.

In addition, the use of the spacer member, by reason of the compression of the latter, provides a dependable seal with respect to the bladder so that leakage therefrom is substantially precluded.

As many changes could be made in the above equipment and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A deformable bladder of resilient material having a mouth of diameter less than that of the maximum diameter of said bladder, a disc of rigid material having an axial stem, said stem having adjacent first and second cylindrical portions adjacent the disc, the first cylindrical portion being of larger diameter than the second, each defining an annular shoulder, said disc having an annular recess in its top surface between its outer periphery and the first cylindrical portion, said recess defining an upstanding peripheral rim, said disc being positioned in the mouth of said bladder with the portions of said bladder adjacent the first cylindrical portion and said annular groove being bonded thereto, the thickness of said bladder at the portion thereof slightly inward of the periphery of said disc being greater than the thickness of said first cylindrical portion, a spacer disc of resilient material encompassing the second cylindrical portion of said stem, said spacer disc being bonded to said second cylindrical portion, said spacer disc having a relatively flat annular portion on its undersurface adjacent its inner periphery adapted to seat on the shoulder of said first cylindrical portion and being bonded thereto, said spacer disc also being bonded to at least a portion of the outer surface of said bladder adjacent its mouth, a portion of said spacer disc outwardly of said flat annular portion being inclined past the plane of said flat annular portion, said spacer disc having an annular bead at its inner periphery on the surface thereof opposed to said flat annular portion and extending beyond the annular shoulder of said second cylindrical portion, and a portion of said spacer disc between the flat portion thereof and the inclined portion thereof being aligned with the annular peripheral rim of said rigid disc.

2. The combination set forth in claim 1 in which an elongated container of rigid material is provided having a port at one end of diameter slightly less than the diameter of said stem between the shoulder of said second cylindrical portion and the outer end of the stem, whereby said stem will protrude through said port with little transverse play, the protruding portion of said stem being threaded, a nut screwed on said threaded portion, whereby when said nut is tightened, to move the stem outwardly, the second annular shoulder will abut against the inner surface of the container about the periphery of said port and the portion of the spacer disc adjacent its inner periphery will be compressed to compress the adjacent portion of said bladder against said peripheral rim thereby securely to retain the mouth of the bladder in said recess and provide a seal with respect to the container.

References Cited by the Examiner

UNITED STATES PATENTS

| 2,321,836 | 6/43 | Marzo | 222—386.5 |
| 2,354,201 | 7/44 | Dand et al. | 138—30 |
| 2,401,791 | 6/46 | Overbeke | 138—30 |
| 2,513,455 | 7/50 | Cornelius | 239—323 |
| 2,877,801 | 3/59 | Mercier | 138—30 |

LEWIS J. LENNY, *Primary Examiner.*